A. H. JARECKI.

PIPE-TONGS.

No. 7,650.

Reissued May 1, 1877.

WITNESSES.

Henry N. Miller

Hank Gall

INVENTOR

Albert H. Jarecki,

Alexander Mattson

ATTORNEY.

N. PETERS, PHOTO-LITHOGRAPHER, WASHINGTON, D. C.

UNITED STATES PATENT OFFICE.

ALBERT H. JARECKI, OF ERIE, PENNSYLVANIA.

IMPROVEMENT IN PIPE-TONGS.

Specification forming part of Letters Patent No. 138,161, dated April 22, 1873; reissue No. 7,650, dated May 1, 1877; application filed April 6, 1877.

*To all whom it may concern:*

Be it known that I, ALBERT H. JARECKI, of Erie, in the county of Erie and State of Pennsylvania, have invented certain new and useful Improvements in Pipe-Tongs; and I do hereby declare that the following is a full, clear, and exact description thereof, reference being had to the accompanying drawings, and to the letters of reference marked thereon, which form part of this specification.

My invention relates to pipe-tongs; and it consists in a reversible bit inserted in a slotted head made at the extremity of one of the handles of the pipe-tongs; also, in said head, having a slot or mortise extending through the same, in combination with a detachable and reversible bit inserted in the slot, and in combination with a hook on the other handle; and it further consists of a forked head on one of the handles, a reversible bit movable through a mortise in such head, and a device for operating the bit; and, also, in the construction and combination of parts, as will be hereinafter more fully set forth.

In order to enable others skilled in the art to which my invention appertains to make and use the same, I will now proceed to describe its construction and operation, referring to the annexed drawing, in which—

Figure 1:
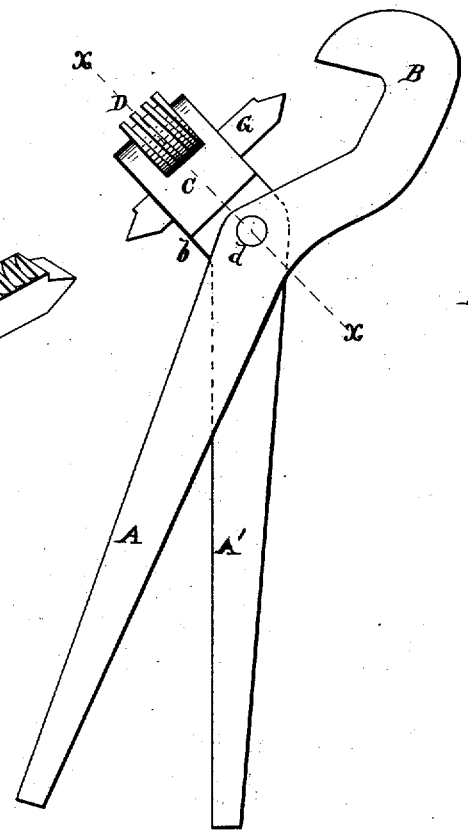
Figure 2:
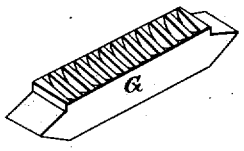
Figure 3:
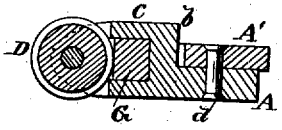

Figure 1 is a side view of my improved pipe-tongs. Fig. 2 is a perspective view of the movable bar or bit. Fig. 3 is a section through the line *x x* of Fig. 1.

A and A′ represent the two handles of my pipe-tongs, pivoted together at *d*.

The handle A is extended beyond the pivot, substantially in the manner shown in Fig. 1, and forms the hook B.

The other handle, A′, extends also beyond the pivot, and is bent nearly at right angles, and is provided with an enlargement or head, C, having shoulder *b*, which shoulder forms stops for the handles, both in opening and closing.

The outer end of the head C is forked, and in the same is journaled a worm-wheel, D, which gears with and operates a cogged steel bar or bit, G, passing through a mortise or opening in the head C.

Both ends of the bar or bit G are beveled and sharpened, so that the bit can be reversed when one end gets dull. It can readily be taken out for sharpening and returned again, or replaced by another when worn out.

The bit G is made of angular form in cross-section, as shown, and the slot or opening in the head C is made of corresponding form, so that the bit can, under no circumstances, be twisted when grasping a pipe; and when the bit is in position it will readily be seen that it is held firmly, and all movement thereof is prevented, whether lengthwise or in any other direction.

These tongs gripe the pipe firmly, and are easily adjusted to any size of pipe.

Having thus fully described my invention, what I claim as new, and desire to secure by Letters Patent, is—

1. A reversible bit inserted in a slotted head made at the extremity of one of the handles of pipe-tongs, for the purpose set forth.

2. The head C on one of the handles, having a slot or mortise extending through the same, in combination with a detachable and reversible bit inserted in the slot, and in combination with a hook, B, on the other handle, substantially as and for the purposes herein set forth.

3. The combination, in pipe-tongs, of a forked head on one of the handles, a reversible and detachable bit movable through a mortise in such head, and a device in the forked head for operating the bit, for the purposes set forth.

4. The bit G, pointed and sharpened on both ends, serrated on one face, and operated by the worm-wheel D, as and for the purposes herein set forth.

5. The combination of the handles A A′, hook B, forked and mortised head C, worm-wheel D, and reversible and serrated bit G, all constructed and arranged substantially as and for the purposes herein set forth.

In testimony that I claim the foregoing I have hereunto set my hand this 4th day of April, 1877.

ALBERT H. JARECKI.

Witnesses:

FRANK GALT,
H. AUBREY TOULMIN.